United States Patent [19]

Maroulis et al.

[11] Patent Number: 4,747,854

[45] Date of Patent: May 31, 1988

[54] SELECTIVE CHROMATOGRAPHIC PROCESS USING AN ION-EXCHANGED, DEHYDRATED CHABAZITE ADSORBENT

[75] Inventors: Peter J. Maroulis, Allentown; Charles G. Coe, Macungie; Steven M. Kuznicki, Easton; David A. Roberts, Allentown, all of Pa.

[73] Assignee: Air Products and Chemicals, Inc., Allentown, Pa.

[21] Appl. No.: 66,789

[22] Filed: Jun. 25, 1987

Related U.S. Application Data

[63] Continuation of Ser. No. 866,544, May 22, 1986, abandoned.

[51] Int. Cl.$^4$ .............................................. B01D 53/04
[52] U.S. Cl. .......................................... 55/66; 55/67; 55/68; 55/75
[58] Field of Search .................. 55/68, 75, 67, 197, 55/386, 66; 502/56, 64, 78, 79, 85

[56] References Cited

U.S. PATENT DOCUMENTS

| | | | |
|---|---|---|---|
| 2,882,244 | 4/1959 | Milton | 55/75 X |
| 2,988,503 | 6/1961 | Milton et al. | 55/75 X |
| 3,069,897 | 12/1962 | Sanford | 55/67 X |
| 3,078,639 | 2/1963 | Milton | 55/75 X |
| 3,078,644 | 2/1963 | Milton | 55/75 |
| 3,597,169 | 8/1971 | Savage | 55/75 X |
| 3,698,157 | 10/1972 | Allen et al. | 55/67 |
| 3,699,181 | 10/1972 | Kmecak et al. | 502/78 X |
| 3,699,182 | 10/1972 | Cattanach | 55/67 X |
| 3,724,170 | 4/1973 | Allen et al. | 55/67 |
| 3,795,711 | 3/1974 | Worrell et al. | 55/67 X |
| 3,864,282 | 2/1975 | Young | 502/79 X |
| 3,885,927 | 5/1975 | Sherman et al. | 55/75 X |
| 3,960,520 | 6/1976 | Allen | 55/67 X |
| 4,239,509 | 12/1980 | Bligh et al. | 55/75 X |
| 4,477,267 | 10/1984 | Reiss | 55/75 X |
| 4,481,018 | 11/1984 | Coe et al. | 55/75 X |
| 4,544,378 | 10/1985 | Coe et al. | 55/68 |
| 4,557,736 | 12/1985 | Sircar et al. | 55/75 X |

FOREIGN PATENT DOCUMENTS

| | | |
|---|---|---|
| 104962 | 4/1974 | Fed. Rep. of Germany . |
| 223203 | 12/1984 | Japan . |
| 34689 | 8/1985 | Japan ................................... 55/197 |
| 507812 | 4/1976 | U.S.S.R. ................................. 55/67 |

OTHER PUBLICATIONS

Andronikashvili et al., "Chromatographic Separation of Low-Boiling Inorganic and Hydrocarbon Gas Mixtures on Zedites", *J. of Chrom.* 292 (1984), pp. 3–8.
Andronikashvili, "The Use of Zeolites in Gas Chromatography", Fhurnal Vses, Khim, vol. 28, No. 1, 1983, pp. 96–100.
Brettell et al., "Cryogenic Techniques in Gas Chromatography", American Laboratory, Oct. 1985.
Gillis et al., "Selective Retention of Oxygen Using Chromatographic Columns Containing Metal Chelate Polymers", Anal. Chem. 1985, 57, pp. 1572–1577.
Pollock et al., "Gas Chromatographic Separation . . . ", J. of Chromatographic Science, vol. 22, Aug. 84, pp. 343–347.
Kyryacos et al., "Separation . . . by Gas Adsorption Chromatography", Analytical Chem., vol. 29, May 1957, p. 787.

*Primary Examiner*—Robert Spitzer
*Attorney, Agent, or Firm*—Willard Jones, II; James C. Simmons; William F. Marsh

[57] ABSTRACT

The present invention relates to a process for the selective adsorption and separation of one or more constituents from a gas stream in a gas chromatograph, wherein the gas stream is contacted with a dehydrated chabazite adsorbent having a residual water content of less than 1.5 wt % and having at least 50% of any exchangeable ion capacity exchanged with a polyvalent metal cation. The process of the present invention both anticipates separation of the constituents due to either a difference in the heats of adsorption of the constituents or a size exclusion effect.

6 Claims, 3 Drawing Sheets

NITROGEN AND ARGON ISOTHERMS OF Ca CHABAZITE AT 30 C

SELECTIVE CHROMATOGRAPHIC PROCESS USING AN ION-EXCHANGED, DEHYDRATED CHABAZITE ADSORBENT

This is a continuation of co-pending application Ser. No. 06/866,544 filed on 5/22/86, now abandoned.

TECHNICAL FIELD

The present invention is directed to a selective zeolitic adsorbent, a method of activation thereof, and the processes utilizing the selective adsorbent.

BACKGROUND OF THE PRIOR ART

Authors, T. G. Andronikashvili and G. V. Tsitsishvili, in *Journal of Chromatography*, 292, (1984), pages 3–8, show the use of synthetic zeolites of the X, Y and Z types, erionite and mordenite, as well as, natural zeolites, such as mordenite and clinoptilolite, for chromatographic separation of low-boiling inorganic and hydrocarbon gas mixtures. The zeolites referenced in the article were exchanged with $Li^+$, $K^+$, $Rb^+$, $Cs^+$, $Ag^+$, $Mg^{2+}$, $Ca^{2+}$, $Sr^+$, $Ba^{2+}$ and $Cd^{2+}$ and subsequently heated at 300° C. to 500° C. for four to several hours.

J. de Zeeuw and R. C. M. de Niss in *Chrompack Topics*, 12, (1985), pages 1–4, show the use of fused silica PLOT Molecular Sieve 5A for separating permanent gases.

T. A. Bretell and R. L. Grob in *American Laboratory*, October, 1985, pages 19–32, disclose the separation of permanent gases using long column and/or subambient temperatures. Column lengths varied from 15 to 33 feet, and temperatures from ambient to −78° C. Two different materials were used for the separations, they are Molecular Sieve 5A and Chromosorb 102.

Another article by J. N. Gillis, R. E. Sievers and G. E. Pollock, *Analytical Chemistry*, 57, (1985), pages 1572 to 1577, teach the use of a metal chelate polymer column for separating argon and oxygen at ambient temperature from a 3 μl sample of air. The limitations disclosed in the article are: it cannot perform argon/oxygen separations at temperatures above ambient, small sample volumes are used, high concentrations of components are separated with no mention of trace analysis and when oxygen is separated from the sample, argon and nitrogen coelute.

An article by G. E. Pollock, D. O'Hara and O. L. Hollis, in the *Journal of Chromatographic Science*, 22 (1984), pages 343–347, teaches the separation of permanent gases using divinyl-benzene, ethylene glycol dimethyacrylate and combinations of the two polymers. To obtain baseline resolution of the two components in the sample, especially argon and nitrogen, long columns, in excess of 30 feet, were used at subambient temperatures ranging from 2° C. to 22° C. In addition, high concentration samples were used for the analysis and no mention was made concerning sample volume.

Japanese Patent Application No. 59,233,203 teaches the use of various cation forms of mordenite for separating argon from gaseous mixtures containing nitrogen; no details are given concerning the activation procedure.

German Pat. No. 104,962 discloses a process for separating argon from gaseous mixtures containing nitrogen and/or oxygen using various forms of mordenite. The patent teaches that argon in dry air can be separated from nitrogen and oxygen over a sodium mordenite adsorbent, however, the nitrogen and the oxygen coelute unseparated.

Although the prior art has taught numerous systems for the separation of permanent gases, these systems have been unable to separate oxygen from argon at ambient conditions. The present invention achieves these separations, even at mild conditions.

SUMMARY OF THE PRESENT INVENTION

The present invention relates to the activation of a zeolitic composition to produce a highly selective adsorbent and the uses for the adsorbent. Basically, the activation procedure requires that the base zeolite has in at least a portion, preferably at least 50%, of the exchangeable ion capacity a metal cation with a charge density of 2.0 or greater. These metal cations with a charge density of 2.0 or greater can be present because they are naturally occurring or because the original cations have been exchanged according to any of the established methods in the art. Once the zeolitic composition has these cations present in the structure, the zeolite must be thoroughly dehydrated. This dehydration is accomplished by heating the zeolitic material for a period of time at temperatures generally in excess of 400° C. in the presence of a non-reactive atmosphere. By non-reactive atmosphere, it is meant any gas or atmosphere that during heating of the zeolite to elevated temperatures will not cause the alteration the zeolite framework structure or the coordination environment surrounding the cations within the structure. By thoroughly dehydration, it is meant that the zeolite has a final water content less than 1.5% by weight, preferably 0.5% by weight.

DETAILED DESCRIPTION OF THE INVENTION

The phenomenon of selective adsorption by molecular sieve zeolites may arise from one of two properties inherent to these crystalline materials. The first property of a molecular sieve that give rise to selective adsorption is because of the extremely uniform porosity demonstrated by these crystalline aluminosilicates. The size or shape of one or more components of a mixture to be separated by selective adsorption may preclude its adsorption by the materials. The separation of n-paraffins from branched chain paraffins is an example of this effect. If a zeolite with a pore opening of ~5 A is employed, the n-paraffin component of a mixture is readily adsorbed, but branched chain paraffins are excluded from adsorption by virtue of their configuration, effecting a separation of the components which is the basis of several commercial processes. If, however, the molecules of the mixture to be separated are all small enough to enter the zeolite crystals, selective adsorption may nonetheless be demonstrated by a second mechanism, cationic charge density. Charge density is defined as $Q/r^3$, where Q is the valence state of the cation and r is the crystal ionic radius in Angstroms.

Zeolites have large quantities of exchangeable ion capacity present within their aluminosilicate framework. Exchangeable ion capacity refers to the charge-compensating cations which are present within the zeolitic structure and that can be replaced by other cations in any proportion as long as the electric neutrality of the zeolitic structure is maintained. These cations are situated such that a high proportion may come into contact with adsorbates small enough to enter the crystalline zeolite framework. The energetic interaction of these cations with polar or polarizable adsorbates results in these adsorbates being selectively adsorbed from a mixture of less polar or polarizable species. This effect allows such separations as the selective adsorption of hydrogen from air as demonstrated by calcium exchanged A-type zeolite and sodium mordenite by pressure swing or vacuum swing adsorption processes. A comprehensive summary of the adsorptive properties of prior art molecular sieve zeolites, their causes and uses is found in D. W. Breck, *Zeolite Molecular Sieves*, J. Wiley and Sons, New York, Chapter 8, pages 593-724 (1974).

Since this second mechanism is dependent upon the charge density of the cations in the accessible portion of the zeolitic material, it follows that to tailor these zeolitic materials to be selective adsorbents either the best cations must be present in the proper positions in the material, such as may be found in manufactured or naturally occurring zeolites, or the cations in those positions must be exchanged with the proper cation. In general, for many of the materials used in this application, the starting material was cation exchanged according to the following generalized procedure. Basically, the starting material is ion exchanged in the presence of an excess of a water soluble salt, such as chloride, nitrate, sulfate and the like, of any polyvalent metal. The polyvalent metal can be of the divalent or trivalent transition elements of Groups 1b to 7b and Group 8 of the periodic table, the divalent alkaline earth metal elements of Group 2a and the lanthanide rare earth series. Preferably the polyvalent metal is selected from a group consisting of magnesium, calcium, strontium, barium and mixtures thereof. Still more preferably the polyvalent metal is calcium or magnesium or mixtures thereof. One example of a conventional ion exchange procedure is to repeatedly exchange the starting material with the polyvalent material is an aqueous solution at temperatures up to those at which reflux occurs, e.g. up to about 100° C. and about 1 atmosphere, for a period of 2 to 48 hours until a major portion of the original cations in the accessible portion of the starting material are replaced by polyvalent ions.

Once prepared with at least a major portion of the cationic content in the polyvalent state and washed substantially free of excess nonexchanged cations, the materials are ready for thermal activation.

Highly exchanged, thoroughly dehydrated polyvalent forms of zeolitic adsorbents, especially mordenite and chabazite, have much higher heats of absorption for weakly interacting adsorbates than the corresponding monovalent forms. These higher heats lead to a significant increase in their ability to separate weakly adsorbing gases particularly at low partial pressures for a given set of process conditions. This separating ability is a direct consequence of the difference in the heats of adsorption for the adsorbates of interest and, this heat of adsorption is directly related to the charge density of the cation which is interacting with the adsorbate. Any water or other ligands interacting with these cations will lower its effective charge density and therefore decrease the heat of adsorption for weakly interacting adsorbates.

In order to achieve the maximum heat of adsorption for a given adsorbate, the zeolitic adsorbent must be thoroughly dehydrated. Therefore, the effect of thermal dehydration procedures on the adsorption properties of the polyvalent forms of several zeolitic adsorbents were studied. When compared to the sodium form, longer times and/or high temperatures are needed to fully dehydrate the polyvalent forms of the adsorbents, particularly, if they contain high charge density cations such as calcium or magnesium. When fully dehydrated, the charge balancing cations are left in a dehydrated/dehydroxylated state where they exhibit superior separating properties.

As set out above, the highly exchanged zeolitic adsorbent must be thoroughly dehydrated. Water, being quite polar, is strongly bound to cations having high charge density. It has long been recognized that these materials must be activated or dehydrated at elevated temperatures to remove water or other polar substances which would block adsorption. Dehydration of zeolitic adsorbents for gas adsorption generally means the residual water content in the adsorbent is less than 1.5% by weight water. However, previous zeolite surface scientists in the field of gas adsorption have failed to recognize that the conditions required to achieve this level of dehydration vary depending upon the nature of the charge-compensating cations. It is much more difficult to activate, the example, the polyvalent forms of chabazite compared to the sodium form of chabazite. Since the zeolites in the prior art were not thoroughly dehydrated, intrinsic thermodynamic properties associated with a thoroughly dehydrated zeolites were not observed nor was the ability to separate oxygen from argon observed. Thus, it is a key step of the present invention to thoroughly dehydrate the highly exchanged zeolite so that the water content is no greater than 1.5% by weight, preferably no greater than 0.5% by weight.

Surprisingly, it was found that when thoroughly dehydrated in the presence of a non-reactive atmosphere the polyvalent form of chabazite or other suitable zeolites having a charge density of about 2 or greater can effect the separation of oxygen from argon in a chromatographic column. By non-reactive atmosphere, it is meant any gas or atmosphere that during the heating of the zeolite to elevated temperatures will not cause alteration of the zeolite framework structure or the cations within the structure. Typical non-reactive atmospheres are helium, nitrogen, argon, hydrogen, carbon tetraflouride, other fluorinated hydrocarbons as are typically sold under the trademark of Freon, zero air and the like. It also follows from these findings that the same phenomenon is expected to occur with monovalent forms of zeolites wherein the monovalent cation has a charge density of 2 or greater, i.e. lithium. Additionally, the chabazite or other zeolites, e.g. mordenite, do not need be in the pure form, it is sufficient that the materials are chabazite-containing or zeolite-containing.

No reports of any chabazite displaying nitrogen heats of adsorption in the region of 10 kcal/mole have been found in the literature. Italian researchers disclose that calcium chabazite gives the highest nitrogen/oxygen selectivities, but do not mention or discuss the separation of argon from oxygen. (Nota diPaolo Ciambelli, Vincenzo DeSimone, et al, Rend Accad, Sci. Fis. Mat. Naples, Vol. 50 (1983), pp. 227-233). The data and experimental procedures presented suggest that the calcium chabazite was not thoroughly dehydrated and therefore would not have exhibited the separation of argon and oxygen or the high heat of adsorption for nitrogen.

Other workers used gas chromatography to study the influence of the cation on the adsorption properties and again showed a useful separation of oxygen from nitrogen but no mention of oxygen-argon separation. In both the above cases the chabazites were only dehydrated at 325°-350° C. for one hour. The present invention has shown this is not sufficient to thoroughly dehydrate the adsorbent.

It is believed that the oxygen/argon separation is a direct result of the electric field density surrounding these cations being sufficiently high to interact effectively with the small quadrapole of oxygen allowing it to be separated from argon. Oxygen, with its smaller quadrapole compared to nitrogen and concomitantly smaller degree of interaction with a given electrostatic energy field, is much less sensitive to the charge density of the cation present and requires very high fields to be selectively adsorbed from adsorbates having similar energetics but no quadrapole moment such as argon.

It should be noted that the development of improved chromatographic materials to affect the analysis of oxygen in the presence of argon is an active area of research. Russian workers having reported several gas separations over a wide variety of cation exchanged zeolitic adsorbents (T. G. Andronikashvili and G. V. Tsitsishvili, *Journal of Chromatography*, 292, (1984), 3-8) however have not demonstrated an effective argon-oxygen separation.

A paper by J. de Zeeuw and R. C. M. de Niss, noted above describes the use of a 25 meter fused silica PLOT Molecular Sieve 5 A column for separating permanent gases. The limitations to this material are small sample volume (<0.03 ml) resulting in poor detectable limits; long columns and small sample sizes needed for argon-oxygen baseline resolution; and no mention is made of the column's ability to handle low concentrations of permanent gases. The adsorbents of the present invention do not have these limitations.

R. L. Grob et al (*American Laboratory*, (1985), pages 19-32) and many others have used very long columns, cryogenic temperatures, or preliminary removal of oxygen by catalysts to analyze oxygen in the presence of argon. Partial separation of argon from oxygen was demonstrated using combinations of NaA and Ca-X or Ca-A but these chromatograms were not baseline resolved and could only be carried out at temperatures of 0° C. or lower. (Melikashili Institutes of Physical and Organic Chemistry, Academy of Sciences of the Georgian SSR. Translated from Zavodskaya Laboratoriya, Vol. 41, No. 4, pp. 398-401, April, 1975. Original article submitted July 6, 1973).

A complex multistep procedure for analyzing argon and nitrogen in oxygen has been reported but requires constant regeneration of a pretreatment column which scavenges the oxygen. (M. Verzele, M. Verstappe, and P. Sandra, Journal of Chromatography 209 (1981) 455-457). Custom-made porous polymers have been used as chromatographic packing but give very poor separation. (G. E. Pollack, D. O'Hara, and O. L. Hollis, Journal of Chromatographic Science, Vol 22 (1984). Sievers et al (noted above) has shown the use of porous polymers containing metal complexes will separate oxygen from argon but the argon now coelutes with nitrogen and cannot be used to analyze argon in the presence of oxygen and nitrogen.

In contrast to all the prior art, using a column of fully dehydrated calcium or magnesium chabazite as a chromatographic material provides a direct replacement in existing instrumentation and can be done easily.

To demonstrate the effectiveness of the present invention, the following examples are provided. In these examples, the dehydration step conditions were modified to determine operating ranges. These modifications are in addition to changes in the base zeolite and the polyvalent exchange metal.

EXAMPLES

Example 1

A 500 g sample of 1/16 inch pellets of chabazite (AW-500 obtained from Linde) was exchanged with a one liter portion of 1M $CaCl_2$. The 1M $CaCl_2$ was added slowly to the zeolite contained in a two liter round-bottom flask equipped with a condenser. The solution was brought to reflux over a 30 minute period and held for an additional hour. The exchange solution was decanted and the pellets were washed three times with approximately two liter portions of distilled water. After the wash, a fresh one liter portion of 1M $CaCl_2$ was added to the zeolite pellets and the contents were brought to reflux. The exchange and wash procedures were repeated so as to have a total of four exchanges. After the final wash the zeolite was placed in a flat pan and air dried. Elemental analysis of the exchanged adsorbent indicated that 90% of the exchangable cations were in the calcium form. The zeolite material was then ground to a 60/80 mesh and then placed into an 0.125 inch O.D.×0.085 inch I.D.×6 foot length of 304 stainless steel tubing.

Example 2

A calcium exchanged chabazite zeolite, which was prepared by the procedure of Example 1, was subjected to a heat treatment during which helium gas was flowing over the chabazite. The conditions for the heat treating were as follows: the chabazite was gradually heated from 40° C. to 400° C. using a 3° C./min heating ramp, once the 400° C. temperature was achieved the material was heat soaked for an additional eight hours. The material was then allowed to cool to ambient temperature with the helium stream passing over the material. The flow rates of helium, measured at ambient temperature, were 185 ml/min at a column temperature of 40° C. and 67 ml/min at a column temperature of 400° C.; inlet helium pressure was 75 psig.

Example 3

A calcium exchanged chabazite zeolite, which was prepared by the procedure of Example 1, was subjected to a heat treatment during which helium gas was flowing over the chabazite. The conditions for the heat treating were as follows: the chabazite was gradually heated from 40° C. to 400° C. using a 3° C./min heating ramp, once the 400° C. temperature was achieved the material was heat soaked for an additional eight hours. The material was then allowed to cool to ambient temperature with the helium stream passing over the material. The flow rates of helium, measured at ambient temperature, were 125 ml/min at a column temperature of 40° C. and 17 ml/min at a column temperature of 400° C.; inlet helium pressure was 38 psig.

Example 4

A calcium exchanged chabazite zeolite, which was prepared by the procedure of Example 1, was subjected to a heat treatment during which helium gas was flowing over the chabazite. The conditions for the heat treating were as follows: the chabazite was gradually heated for 40° C. to 400° C. using a 3° C./min heating ramp, once the 400° C. temperature was achieved the material was heat soaked for an additional twenty four (24) hours. The material was then allowed to cool to ambient temperature with the helium stream passing over the material. The flow rates of helium, measured at ambient temperature, were 185 ml/min at a column temperature of 40° C. and 67 ml/min at a column temperature of 400° C.; inlet helium pressure was 75 psig.

Example 5

A calcium exchanged chabazite zeolite, which was prepared by the procedure of Example 1, was subjected to a heat treatment during which helium gas was flowing over the chabazite. The conditions for the heat treating were as follows: the chabazite was gradually heated from 40° C. to 325° C. using a 3° C./min heating ramp, once the 325° C. temperature was achieved the material was heat soaked for an additional eight hours. The material was then allowed to cool to ambient temperature with the helium stream passing over the material. The flow rate of helium, measured at ambient temperature, was 67 ml/min at a column temperature of 325° C.; inlet helium pressure was 66 psig.

Example 6

A calcium exchanged chabazite zeolite, which was prepared by the procedure of Example 1, was subjected to a heat treatment during which helium gas was flowing over the chabazite. The conditions for the heat treating were as follows: the chabazite was gradually heated from 40° C. to 250° C. using a 3° C./min heating ramp, once the 250° C. temperature was achieved the material was heat soaked for an additional eight hours. The material was then allowed to cool to ambient temperature with the helium stream passing over the material. The flow rate of helium, measured at ambient temperature, was 67 ml/min at a column temperature of 250° C.; inlet helium pressure was 62 psig.

Example 7

A calcium exchanged chabazite zeolite, which was prepared by the procedure of Example 1, was subjected to a heat treatment during which helium gas was flowing over the chabazite. The conditions for the heat treating were as follows: the chabazite was gradually heated from 40° C. to 400° C. using a 12° C./min heating ramp, once the 400° C. temperature was achieved the material was heat soaked for an additional eight hours. The material was then allowed to cool to ambient temperature with the helium stream passing over the material. The flow rates of helium, measured at ambient temperature, were 185 ml/min at a column temperature of 40° C. and 67 ml/min at a column temperature of 400° C.; inlet helium pressure was 75 psig.

Example 8

A calcium exchanged chabazite zeolite, which was prepared by the procedure of Example 1, was subjected to a heat treatment during which nitrogen gas was flowing over the chabazite. The conditions for the heat treating were as follows: the chabazite was gradually heated from 40° C. to 400° C. using a 3° C./min heating ramp, once the 400° C. temperature was achieved the material was heat soaked for an additional eight hours. The material was then allowed to cool to ambient temperature with the nitrogen stream passing over the material. The flow rates of nitrogen, measured at ambient temperature, were 185 ml/min at a column temperature of 40° C. and 67 ml/min at a column temperature of 400° C.; inlet nitrogen pressure was 75 psig.

Example 9

A 500 g sample of 1/16 inch pellets of chabazite (AW-500 obtained from Linde) was exchanged with a one liter portion of 1M $MgCl_2$. The 1M $MgCl_2$ was added slowly to the zeolite contained in a two liter round-bottom flask equipped with a condenser. The solution was brought to reflux over a 30 minute period and held for an additional hour. The exchange solution was decanted and the pellets were washed three times with approximately two liter portions of distilled water. After the wash, a fresh one liter portion of 1M $MgCl_2$ was added to the zeolite pellets and the contents were brought to reflux. The exchange and wash procedures were repeated so as to have a total of four exchanges. To ensure a high degree of ion exchange, a fifth exchange was done for an eight hour period. After the final wash the zeolite was placed in a flat pan and air dried. Elemental analysis showed that 60% of the exchange capacity was in the magnesium form, 20% in the calcium form and 20% in the sodium form. The zeolite material was then ground to a 60/80 mesh and then placed into an 0.125 inch O.D.×0.085 inch I.D.×6 foot length of 304 stainless steel tubing.

Example 10

A magnesium exchanged chabazite zeolite, which was prepared by the procedure of Example 9, was subjected to a heat treatment during which helium gas was flowing over the chabazite. The conditions for the heat treating were as follows: the chabazite was gradually heated from 40° C. to 400° C. using a 3° C./min heating ramp, once the 400° C. temperature was achieved the material was heat soaked for an additional eight hours. The material was then allowed to cool to ambient temperature with the helium stream passing over the material. The flow rates of helium, measured at ambient temperature, were 185 ml/min at a column temperature of 40° C. and 67 ml/min at a column temperature of 400° C.; inlet helium pressure was 75 psig.

Example 11

A 500 g sample of 1/16 inch pellets of chabazite (AW-500 obtained from Linde) was exchanged with a one liter portion of 1M $NiCl_2$. The 1M $NiCl_2$ was added slowly to the zeolite contained in a two liter round-bottom flask equipped with a condenser. The solution was brought to reflux over a 30 minute period and held for an additional hour. The exchange solution was decanted and the pellets were washed three times with approximately two liter portions of distilled water. After the wash, a fresh one liter portion of 1M $NiCl_2$ was added to the zeolite pellets and the contents were brought to reflux. The exchange and wash procedures were repeated so as to have a total of four exchanges. After the final wash the zeolite was placed in a flat pan and air dried. Elemental analysis showed that 64% of the exchange capacity was nickel. The zeolite material was then ground to a 60/80 mesh and then placed into an 0.125 inch O.D.×0.085 inch I.D.×6 foot length of 304 stainless steel tubing.

Example 12

A nickel exchanged chabazite zeolite, which was prepared by the procedure of Example 11, was subjected to a heat treatment during which helium gas was flowing over the chabazite. The conditions for the heat treating were as follows: the chabazite was gradually heated from 40° C. to 400° C. using a 3° C./min heating ramp, once the 400° C. temperature was achieved the material was heat soaked for an additional eight hours. The material was then allowed to cool to ambient temperature with the helium stream passing over the material. The flow rates of helium, measured at ambient temperature, were 185 ml/min at a column temperature of 40° C. and 67 ml/min at a column temperature of 400° C.; inlet helium pressure was 75 psig.

Example 13

A 500 g sample of 1/16 inch pellets of chabazite (AW-500 obtained from Linde) was exchanged with a one liter portion of 1M NaCl. The 1M NaCl was added slowly to the zeolite contained in a two liter round-bottom flask equipped with a condenser. The solution was brought to reflux over a 30 minute period and held for an additional hour. The exchange solution was decanted and the pellets were washed three times with approximately two liter portions of distilled water. After the wash, a fresh one liter portion of 1M NaCl was added to the zeolite pellets and the contents were brought to reflux. The exchange and wash procedures were repeated so as to have a total of four exchanges. After the final wash the zeolite was placed in a flat pan and air dried. Elemental analysis showed that 67% of the exchangeable ions were in the sodium form, 24% were in the calcium form, and 11% were in the magnesium form. The zeolite material was then ground to a 60/80 mesh and then placed into an 0.125 inch O.D.×0.085 inch I.D.×6 foot length of 304 stainless steel tubing.

Example 14

A sodium exchanged chabazite zeolite, which was prepared by the procedure of Example 13, was subjected to a heat treatment during which helium gas was flowing over the chabazite. The conditions for the heat treating were as follows: the chabazite was gradually heated from 40° C. to 400° C. using a 3° C./min heating ramp, once the 400° C. temperature was achieved the material was heat soaked for an additional eight hours. The material was then allowed to cool to ambient temperature with the helium stream passing over the material. The flow rates of helium, measured at ambient temperature, were 185 ml/min at a column temperature of 40° C. and 67 ml/min at a column temperature of 400° C.; inlet helium pressure was 75 psig.

Example 15

An aluminum exchanged chabazite was prepared by exchanging the ammonium form of chabazite with an aqueous $Al(NO_3)_3$ solution. In the preparation, a 200 g portion of 1/16 inch pellets of ammonium chabazite was exchanged by adding 500 cc of 0.1M $Al(NO_3)_3$ solution to the zeolite, bringing the solution to reflux and maintaining the reflux for an hour. After cooling, the exchange solution was decanted, and the pellets were washed three times with approximately one liter portions of distilled water. After the wash, a fresh 500 cc portion of 0.1M $Al(NO_3)_3$ solution was added, and the above procedure was repeated. The procedure was repeated so that a total of four exchanges had taken place, however, in the last exchange, the reflux was continued for seven hours instead of one hour to assure thorough exchange. Elemental analysis indicates that approximately 60% of the exchangeable cations are aluminum species. The zeolite material was then ground to a 60/80 mesh and then placed into an 0.125 inch O.D.×0.085 inch I.D.×6 foot length of 304 stainless steel tubing.

Example 16

An aluminum exchanged chabazite zeolite, which was prepared by the procedure of Example 15, was subjected to a heat treatment during which helium gas was flowing over the chabazite. The conditions for the heat treating were as follows: the chabazite was gradually heated from 40° C. to 400° C. using a 3° C./min heating ramp, once the 400° C. temperature was achieved the material was heat soaked for an additional eight hours. The material was then allowed to cool to ambient temperature with the helium stream passing over the material. The flow rates of helium, measured at ambient temperature, were 185 ml/min at a column temperature of 40° C. and 67 ml/min at a column temperature of 400° C.; inlet helium pressure was 75 psig.

Example 17

A 500 g sample of 8-12 mesh beads of a 13X (NaX) zeolite, obtained from the Davison Division of W. R. Grace, was exchanged with a one liter portion of 1M $CaCl_2$. The 1M $CaCl_2$ was added slowly to the zeolite contained in a two liter roudn-bottom flask equipped with a condenser. The solution was brought to reflux over a 30 minute period and held for an additional hour. The exchange solution was decanted and the pellets were washed three times with approximately two liter portions of distilled water. After the wash, a fresh one liter portion of 1M $CaCl_2$ was added to the zeolite pellets and the contents were brought to reflux. The exchange and wash procedures were repeated so as to have a total of four exchanges. After the final wash the zeolite was placed in a flat pan and air dried. Elemental analysis indicated that 97% of the exchangeable cations were calcium. The zeolite material was then ground to a 60/80 mesh and then placed into an 0.125 inch O.D.×0.085 inch I.D.×6 foot length of 304 stainless steel tubing.

Example 18

A calcium exchanged X zeolite, which was prepared by the procedure of Example 17, was subjected to a heat treatment during which helium gas was flowing over the chabazite. The conditions for the heat treating were as follows: the chabazite was gradually heated from 40° C. to 400° C. using a 3° C./min heating ramp, once the 400° C. temperature was achieved the material was heat soaked for an additional eight hours. The material was then allowed to cool to ambient temperature with the helium stream passing over the material. The flow rates of helium, measured at ambient temperature, were 185 ml/min at a column temperature of 40° C. and 67 ml/min at a column temperature of 400° C.; inlet helium pressure was 75 psig.

Example 19

A 500 g sample of 1/16 inch pellets of a 4A (NaA) zeolite, obtained from Linde, was exchanged with a one liter portion of 1M $CaCl_2$. The 1M $CaCl_2$ was added slowly to the zeolite contained in a two liter round-bottom flask equipped with a condenser. The solution was brought to reflux over a 30 minute period and held for an additional hour. The exchange solution was decanted and the pellets were washed three times with approximately two liter portions of distilled water. After the wash, a fresh one liter portion of 1M $CaCl_2$ was added to the zeolite pellets and the contents were brought to reflux. The exchange and wash procedures were repeated so as to have a total of four exchanges. After the final wash the zeolite was placed in a flat pan and air dried. Elemental analysis showed that 99% of the exchangeable ion were in the calcium form. The zeolite material was then ground to a 60/80 mesh and then placed into an 0.125 inch O.D.×0.085 inch I.D.×6 foot length of 304 stainless steel tubing.

Example 20

A calcium exchanged A zeolite, which was prepared by the procedure of Example 19, was subjected to a heat treatment during which helium gas was flowing over the chabazite. The conditions for the heat treating were as follows: the chabazite was gradually heated from 40° C. to 400° C. using a 3° C./min heating ramp, once the 400° C. temperature was achieved the material was heat soaked for an additional eight hours. The material was then allowed to cool to ambient temperature with the helium stream passing over the material. The flow rates of helium, measured at ambient temperature, were 185 ml/min at a column temperature of 40° C. and 67 ml/min at a column temperature of 400° C.; inlet helium pressure was 75 psig.

Example 21

Ion exchange procedures identical to those of Example 1 were carried out on a naturally occurring chabazite obtained from Durkee, Oregon. Elemental analysis of the exchanged chabazite indicated that 70% of the exchangeable cations were in the calcium form. The zeolite material was then ground to a 60/80 mesh and then placed into an 0.125 inch O.D.×0.085 inch I.D.×6 foot length of 304 stainless steel tubing.

Example 22

A calcium exchanged chabazite, which was prepared by the procedure of Example 21, was subjected to a heat treatment during which helium gas was flowing over the chabazite. The conditions for the heat treating were as follows: the chabazite was gradually heated from 40° C. to 400° C. using a 3° C./min heating ramp, once the 400° C. temperature was achieved the material was heat soaked for an additional eight hours. The material was then allowed to cool to ambient temperature with the helium stream passing over the material. The flow rates of helium, measured at ambient temperature, were 185 ml/min at a column temperature of 40° C. and 67 ml/min at a column temperature of 400° C.; inlet helium pressure was 75 psig.

Example 23

A 500 g sample of 1/16 inch pellets of sodium mordenite, obtained from Norton Chemical, was exchanged twice with one liter portions of 2M $CaCl_2$. Each exchange lasted approximately 2 hours. Between the exchanges, the adsorbent was washed at least three times with distilled water. Following the second exchange, the adsorbent was washed three times with distilled water, placed in a flat pan, and dried. Elemental analysis showed that about 70% of the exchangeable ions were in the calcium form. The zeolite material was then ground to a 60/80 mesh and than placed into an 0.125 inch O.D.×0.085 inch I.D.×6 foot length of 304 stainless steel tubing.

Example 24

A calcium exchanged mordenite, which was prepared by the procedure of Example 23, was subjected to a heat treatment during which helium gas was flowing over the mordenite. The conditions for the heat treating were as follows: the mordenite was gradually heated from 40° C. to 400° C. using a 3° C./min heating ramp, once the 400° C. temperature was achieved the material was heat soaked for an additional eight hours. The material was then allowed to cool to ambient temperature with the helium stream passing over the material. The flow rates of helium, measured at ambient temperature, were 185 ml/min at a column temperature of 40° C. and 67 ml/min at a column temperature of 400° C.; inlet helium pressure was 75 psig.

Example 25

A calcium chabazite adsorbent prepared as described in Example 1 was packed into a 6 foot by ¼ inch stainless steel column and dehydrated according to the procedure in Example 4. The column was evaluated for analyses of percent levels of argon and oxygen using the following set of instrumental conditions:

Instrument: Perkin-Elmer 910, Autolab System IV-B Integrator
Integrator Parameters: 10PW, 20SS
Carrier Gas: Zero Grade Helium
Carrier Gas Flow Rate: 50 cc/min
Injection Temperature: 150° C.
Column Temperature: 48° C.
Thermal Conductivity Detector Current: 225 mA
Thermal Conductivity Detector Temperature: 150° C.
Ballast Pressure: 0.5 atm
Calibration Standards:
   (1) 1.004% Argon in Helium
   (2) 15.419% Argon in Helium
   (3) UPC Grade Oxygen
   (4) Room Air
   (5) 0.1% Argon in Bulk Oxygen Using the above conditions, the column successfully separated argon and oxygen with sufficient resolution for good quantification. The argon response factors of the two standards indicated linearity of response over the the concentration range of 1 to 15 percent argon. Analysis of room air vs. the standards yielded results consistent with literature values, i.e. argon: 0.93% and oxygen: 20.81%. The analysis had a precision of ±0.5% relative standard deviation. The example shows that percentage levels of argon in oxygen can be quantitatively analyzed at above ambient temperatures.

The materials produced in Examples 2–8, 10, 12, 14, 16, 18, 20, 22, and 24 were tested with a gas chromatograph to determine if they could separate ppm concentrations of argon and oxygen at temperatures greater than ambient. Each material was evaluated for analyses of argon and oxygen using an ultrasonic detector and the following set of instrumental conditions:

Instrument: Hewlett-Packard 5890
Carrier Gas: Research Grade Helium
Column Temperature: 40° C. and 70° C.
Corrected Flow Rate:
  10.9 cc/min at 40° C.
  11.7 cc/min at 70° C.
Detector Temperature: 100° C.
Sample Volume: 1.0 cc To carry out this test two standard gas blends were used. Helium is the bulk gas component in each of the blends; an analysis of non-helium component gases in each of these two blends are as follow:

| Component | Concentration (vppm) | Concentration (ng/cc) |
|---|---|---|
| Standard Blend 1 | | |
| Neon | 11.1 | 9.2 |
| Argon | 2.2 | 3.6 |
| Oxygen | 1.7 | 2.2 |
| Hydrogen | 2.1 | 0.2 |
| Nitrogen | 4.0 | 4.6 |
| Methane | 2.4 | 1.6 |
| Carbon Monoxide | 3.5 | 4.0 |
| Carbon Dioxide | 4.1 | 7.4 |
| Standard Blend 2 | | |
| Neon | 211 | 174 |
| Argon | 199 | 325 |
| Oxygen | 216 | 283 |

The gas chromatographic analyses were performed at 40° C. and 70° C. using a helium carrier gas. An ultrasonic detector was used to evaluate these materials. The two temperatures were chosen so that heats of adsorptions could be calculated for the samples. The chromatographic analyses of the above examples are listed in Table I. Table I details the retention time (RT), peak height (PH), and attenuation (Attn), in addition, the amount of dry zeolitic adsorbent material in the column is listed. An entry of ND on the table is indicative that oxygen was not detected by the analysis and hence no data were obtained.

TABLE I

| | Gas Blend #1 | | | | | | Gas Blend #2 | | | | | |
|---|---|---|---|---|---|---|---|---|---|---|---|---|
| | 40° C. Run | | | 70° C. Run | | | 40° C. Run | | | 70° C. Run | | |
| | RT | PH | Attn | RT | PH | Attn | RT | PH | Attn | RT | PH | Attn |
| Example 2 (4.20 g - Ca Chabazite) | | | | | | | | | | | | |
| Neon | 0.68 | 118 | 4 | 0.68 | 98 | 4 | 0.69 | 149 | 32 | 0.66 | 145 | 32 |
| Argon | 3.33 | 48 | 1 | 2.13 | 66 | 1 | 3.37 | 114 | 32 | 2.09 | 170 | 32 |
| Oxygen | ND | — | — | ND | — | — | 4.41 | 120 | 8 | 2.44 | 68 | 32 |
| Example 3 (3.95 g - Ca Chabazite) | | | | | | | | | | | | |
| Neon | 0.71 | 121 | 4 | 0.62 | 123 | 4 | 0.68 | 153 | 32 | 0.62 | 154 | 32 |
| Argon | 2.98 | 83 | 1 | 1.74 | 130 | 1 | 2.89 | 132 | 32 | 1.75 | 101 | 64 |
| Oxygen | ND | — | — | ND | — | — | 3.81 | 22 | 32 | 2.04 | 57 | 32 |
| Example 4 (4.03 g - Ca Chabazite) | | | | | | | | | | | | |
| Neon | 0.71 | 117 | 4 | 0.64 | 118 | 4 | 0.71 | 154 | 32 | 0.64 | 154 | 32 |
| Argon | 4.12 | 60 | 1 | 2.29 | 103 | 1 | 4.15 | 101 | 32 | 2.30 | 167 | 32 |
| Oxygen | ND | — | — | ND | — | — | 6.64 | 45 | 4 | 3.01 | 20 | 32 |
| Example 5 (4.22 g - Ca Chabazite) | | | | | | | | | | | | |
| Neon | 0.64 | 117 | 4 | 0.63 | 117 | 4 | 0.64 | 154 | 32 | 0.63 | 154 | 32 |
| Argon | 2.14 | 112 | 1 | 1.52 | 142 | 1 | 2.14 | 167 | 32 | 1.52 | 117 | 64 |
| Oxygen | ND | — | — | ND | — | — | 2.42 | 88 | 32 | 1.62 | 73 | 64 |
| Example 6 (4.23 g - Ca Chabazite) | | | | | | | | | | | | |
| Neon | 0.68 | 115 | 4 | 0.59 | 118 | 4 | 0.69 | 151 | 32 | 0.60 | 154 | 32 |
| Argon | — | — | — | — | — | — | 1.79 | — | — | 1.19 | — | — |
| Oxygen | ND | — | — | ND | — | — | 1.79 | — | — | 1.19 | — | — |
| Example 7 (4.07 g - Ca Chabazite) | | | | | | | | | | | | |
| Neon | 0.67 | 115 | 4 | 0.63 | 114 | 4 | 0.68 | 154 | 32 | 0.63 | 156 | 32 |
| Argon | 3.20 | 82 | 1 | 1.94 | 122 | 1 | 3.27 | 123 | 32 | 1.94 | 98 | 64 |
| Oxygen | ND | — | — | ND | — | — | 4.30 | 60 | 16 | 2.28 | 39 | 64 |
| Example 8 (4.09 g - Ca Chabazite) | | | | | | | | | | | | |
| Neon | 0.69 | 114 | 4 | 0.63 | 115 | 4 | 0.71 | 148 | 32 | 0.63 | 154 | 32 |
| Argon | 3.57 | 58 | 1 | 2.08 | 93 | 1 | 3.63 | 103 | 32 | 2.05 | 88 | 64 |
| Oxygen | ND | — | — | ND | — | — | 4.76 | 43 | 32 | 2.40 | 49 | 64 |
| Example 10 (3.94 g - Mg Chabazite) | | | | | | | | | | | | |
| Neon | 0.69 | 117 | 4 | 0.65 | 119 | 4 | 0.69 | 151 | 32 | 0.66 | 153 | 32 |
| Argon | 2.11 | 97 | 1 | 1.48 | 134 | 1 | 2.09 | 179 | 32 | 1.47 | 120 | 64 |
| Oxygen | ND | — | — | ND | — | — | 2.51 | 50 | 32 | 1.62 | 51 | 64 |
| Example 12 (4.12 g - Ni Chabazite) | | | | | | | | | | | | |
| Neon | — | — | — | — | — | — | 0.68 | 154 | 32 | 0.62 | 157 | 32 |
| Argon | — | — | — | — | — | — | 1.86 | 100 | 64 | 1.30 | 130 | 64 |
| Oxygen | — | — | — | — | — | — | ND | — | — | ND | — | — |
| Example 14 (4.07 g - Na Chabazite) | | | | | | | | | | | | |
| Neon | — | — | — | — | — | — | 0.68 | 152 | 32 | 0.68 | 77 | 64 |

TABLE I-continued

| | Gas Blend #1 | | | | | | Gas Blend #2 | | | | | |
|---|---|---|---|---|---|---|---|---|---|---|---|---|
| | 40° C. Run | | | 70° C. Run | | | 40° C. Run | | | 70° C. Run | | |
| | RT | PH | Attn | RT | PH | Attn | RT | PH | Attn | RT | PH | Attn |
| Argon | — | — | — | — | — | — | 1.88 | 167 | 32 | 1.72 | 117 | 64 |
| Oxygen | — | — | — | — | — | — | ND | — | — | ND | — | — |
| Example 16 (3.88 g - Al Chabazite) | | | | | | | | | | | | |
| Neon | — | — | — | — | — | — | 0.67 | 155 | 32 | 0.62 | 79 | 64 |
| Argon | — | — | — | — | — | — | 1.88* | 97 | 64 | 1.31* | 185 | 64 |
| Oxygen | — | — | — | — | — | — | | | | | | |
| Example 18 (4.27 g - Ca X Zeolite) | | | | | | | | | | | | |
| Neon | — | — | — | — | — | — | 0.69 | 75 | 64 | 0.65 | 77 | 64 |
| Argon | — | — | — | — | — | — | 1.56 | 121 | 64 | 1.19 | 145 | 64 |
| Oxygen | — | — | — | — | — | — | 1.87 | 62 | 64 | 1.33 | 95 | 64 |
| Example 20 (4.47 g - Ca A Zeolite) | | | | | | | | | | | | |
| Neon | 0.67 | 123 | 4 | — | — | — | 0.68 | 155 | 32 | — | — | — |
| Argon | 1.59 | 175 | 1 | — | — | — | 1.61 | 128 | 64 | — | — | — |
| Oxygen | — | — | — | — | — | — | 1.71 | 93 | 64 | — | — | — |
| Example 22 (3.67 g - Ca Chabazite [Oregon]) | | | | | | | | | | | | |
| Neon | 0.73 | 123 | 4 | — | — | — | 0.72 | 151 | 32 | 0.67 | 152 | 32 |
| Argon | 2.43 | 33 | 1 | — | — | — | 2.39 | 160 | 32 | 1.63 | 109 | 64 |
| Oxygen | ND | — | — | — | — | — | 2.73 | 100 | 32 | 1.74 | 82 | 64 |
| Example 24 (4.39 g - Ca Mordinite) | | | | | | | | | | | | |
| Neon | — | — | — | — | — | — | 0.64 | 154 | 32 | 0.61 | 156 | 32 |
| Argon | — | — | — | — | — | — | 3.02 | 79 | 32 | 1.83 | 150 | 32 |
| Oxygen | — | — | — | — | — | — | ND | — | — | ND | — | — |

*Argon/Oxygen Combined

Retention time data at 40° C. and 70° C. were used to calculate the isosteric heat of adsorption ($\Delta H_{ads}$), as well as, argon/oxygen selectivity and Henry constants.

Resolution ($R_s$) was determined with the following equation:

$$R_s = \frac{2(RT_{oxy} - RT_{arg})}{W_{oxy} + W_{arg}}$$

where:
RT = retention time
W = peak width

Resolution gives an indication of the peak shape and the degree of skewness or asymmetry. Resolution is related to peak height, because for constant peak area, increases in peak height must be accompanied by decreased peak width.

Peak height is measured in millimeters using a scale because an integration does not always pick up peaks that result from low concentration components which approach the detection limit of the detector.

Attenuation (Attn) is the reduction or enlargement of the detector signal. For example, a peak obtained with an Attn=4 would be reduced by a factor of 8 if it was obtained with an Attn=32. When peak height is multiplied by the manually measured attenuation, all the heights can be compared on an equal basis.

From the data listed in Table I, resolution factors, adsorption Henry constants ($\kappa$), the argon/oxygen selectivity, and heats of adsorption were calculated for each of the above described examples. These calculations are listed in Table II.

TABLE II

| | Example 2 | | | |
|---|---|---|---|---|
| | Gas Blend #1 | | Gas Blend #2 | |
| | 40° C. Run | 70° C. Run | 40° C. Run | 70° C. Run |
| Argon/Oxygen Selectivity | — | — | 1.39 | 1.25 |
| Argon Henry Constant (mmol/g/atm) | 0.267 | 0.143 | 0.270 | 0.141 |
| Oxygen Henry Constant (mmol/g/atm) | — | — | 0.375 | 0.176 |
| Resolution Factor | — | — | 2.39 | 1.35 |

| | Argon | | Oxygen | |
|---|---|---|---|---|
| | Blend #1 | Blend #2 | Blend #1 | Blend #2 |
| Heat of Adsorption (kcal/mol) | −4.43 | −4.61 | — | −5.38 |

| | Example 3 | | | |
|---|---|---|---|---|
| | Gas Blend #1 | | Gas Blend #2 | |
| | 40° C. Run | 70° C. Run | 40° C. Run | 70° C. Run |
| Argon/Oxygen Selectivity | — | — | 1.41 | 1.25 |
| Argon Henry Constant (mmol/g/atm) | 0.243 | 0.118 | 0.237 | 0.119 |
| Oxygen Henry Constant (mmol/g/atm) | — | — | 0.335 | 0.149 |
| Resolution Factor | — | — | 1.94 | 1.32 |

| | Argon | | Oxygen | |
|---|---|---|---|---|
| | Blend #1 | Blend #2 | Blend #1 | Blend #2 |

TABLE II-continued

| | | | | |
|---|---|---|---|---|
| Heat of Adsorption (kcal/mol) | −5.17 | −4.91 | — | −5.76 |

Example 4

| | Gas Blend #1 | | Gas Blend #2 | |
|---|---|---|---|---|
| | 40° C. Run | 70° C. Run | 40° C. Run | 70° C. Run |
| Argon/Oxygen Selectivity | — | — | 1.72 | 1.43 |
| Argon Henry Constant (mmol/g/atm) | 0.358 | 0.170 | 0.361 | 0.171 |
| Oxygen Henry Constant (mmol/g/atm) | — | — | 0.623 | 0.244 |
| Resolution Factor | — | — | 2.04 | 1.16 |

| | Argon | | Oxygen | |
|---|---|---|---|---|
| | Blend #1 | Blend #2 | Blend #1 | Blend #2 |
| Heat of Adsorption (kcal/mol) | −5.30 | −5.32 | — | −6.67 |

Example 5

| | Gas Blend #1 | | Gas Blend #2 | |
|---|---|---|---|---|
| | 40° C. Run | 70° C. Run | 40° C. Run | 70° C. Run |
| Argon/Oxygen Selectivity | — | — | 1.19 | 1.11 |
| Argon Henry Constant (mmol/g/atm) | 0.150 | 0.0875 | 0.150 | 0.0875 |
| Oxygen Henry Constant (mmol/g/atm) | — | — | 0.179 | 0.0974 |
| Resolution Factor | — | — | 1.24 | 0.571 |

| | Argon | | Oxygen | |
|---|---|---|---|---|
| | Blend #1 | Blend #2 | Blend #1 | Blend #2 |
| Heat of Adsorption (kcal/mol) | −3.85 | −3.85 | — | −4.31 |

Example 6

| | Gas Blend #1 | | Gas Blend #2 | |
|---|---|---|---|---|
| | 40° C. Run | 70° C. Run | 40° C. Run | 70° C. Run |
| Argon/Oxygen Selectivity | — | — | 1.00 | 1.00 |
| Argon Henry Constant (mmol/g/atm) | 0.109 | 0.0589 | 0.126 | 0.0491 |
| Oxygen Henry Constant (mmol/g/atm) | — | — | 0.126 | 0.0491 |
| Resolution Factor | — | — | 0.00 | 0.00 |

| | Argon | | Oxygen | |
|---|---|---|---|---|
| | Blend #1 | Blend #2 | Blend #1 | Blend #2 |
| Heat of Adsorption (kcal/mol) | −4.39 | −4.57 | — | −4.57 |

Example 7

| | Gas Blend #1 | | Gas Blend #2 | |
|---|---|---|---|---|
| | 40° C. Run | 70° C. Run | 40° C. Run | 70° C. Run |
| Argon/Oxygen Selectivity | — | — | 1.40 | 1.25 |
| Argon Henry Constant (mmol/g/atm) | 0.263 | 0.136 | 0.269 | 0.134 |
| Oxygen Henry Constant (mmol/g/atm) | — | — | 0.376 | 0.168 |
| Resolution Factor | — | — | 2.79 | 1.62 |

| | Argon | | Oxygen | |
|---|---|---|---|---|
| | Blend #1 | Blend #2 | Blend #1 | Blend #2 |
| Heat of Adsorption (kcal/mol) | −4.82 | −4.99 | — | −5.73 |

Example 8

| | Gas Blend #1 | | Gas Blend #2 | |
|---|---|---|---|---|
| | 40° C. Run | 70° C. Run | 40° C. Run | 70° C. Run |
| Argon/Oxygen Selectivity | — | — | 1.39 | 1.25 |
| Argon Henry Constant (mmol/g/atm) | 0.298 | 0.147 | 0.302 | 0.144 |
| Oxygen Henry Constant (mmol/g/atm) | — | — | 0.419 | 0.180 |
| Resolution Factor | — | — | 3.28 | 1.75 |

| | Argon | | Oxygen | |
|---|---|---|---|---|
| | Blend #1 | Blend #2 | Blend #1 | Blend #2 |
| Heat of Adsorption (kcal/mol) | — | — | — | — |

Example 10

| | Gas Blend #1 | | Gas Blend #2 | |
|---|---|---|---|---|
| | 40° C. Run | 70° C. Run | 40° C. Run | 70° C. Run |
| Argon/Oxygen Selectivity | — | — | 1.31 | 1.19 |
| Argon Henry Constant (mmol/g/atm) | 0.153 | 0.087 | 0.150 | 0.082 |
| Oxygen Henry Constant (mmol/g/atm) | — | 0.196 | — | 0.098 |
| Resolution Factor | — | — | 1.56 | 0.811 |

| | Argon | | Oxygen | |
|---|---|---|---|---|
| | Blend #1 | Blend #2 | Blend #1 | Blend #2 |
| Heat of Adsorption (kcal/mol) | — | −4.30 | — | −4.92 |

Example 12

| | Gas Blend #1 | | Gas Blend #2 | |
|---|---|---|---|---|
| | 40° C. Run | 70° C. Run | 40° C. Run | 70° C. Run |

TABLE II-continued

| | Argon | | Oxygen | |
|---|---|---|---|---|
| | Blend #1 | Blend #2 | Blend #1 | Blend #2 |
| Argon/Oxygen Selectivity | — | — | — | — |
| Argon Henry Constant (mmol/g/atm) | — | — | 0.121 | 0.0685 |
| Oxygen Henry Constant (mmol/g/atm) | — | — | — | — |
| Resolution Factor | — | — | — | — |

| | Argon | | Oxygen | |
|---|---|---|---|---|
| | Blend #1 | Blend #2 | Blend #1 | Blend #2 |
| Heat of Adsorption (kcal/mol) | — | −4.06 | — | — |

Example 14

| | Gas Blend #1 | | Gas Blend #2 | |
|---|---|---|---|---|
| | 40° C. Run | 70° C. Run | 40° C. Run | 70° C. Run |
| Argon/Oxygen Selectivity | — | — | — | — |
| Argon Henry Constant (mmol/g/atm) | — | — | 0.173 | 0.106 |
| Oxygen Henry Constant (mmol/g/atm) | — | — | — | — |
| Resolution Factor | — | — | — | — |

| | Argon | | Oxygen | |
|---|---|---|---|---|
| | Blend #1 | Blend #2 | Blend #1 | Blend #2 |
| Heat of Adsorption (kcal/mol) | — | −3.47 | — | — |

Example 16

| | Gas Blend #1 | | Gas Blend #2 | |
|---|---|---|---|---|
| | 40° C. Run | 70° C. Run | 40° C. Run | 70° C. Run |
| Argon/Oxygen Selectivity | — | — | 1.00 | 1.00 |
| Argon Henry Constant (mmol/g/atm) | — | — | 0.132 | 0.0738 |
| Oxygen Henry Constant (mmol/g/atm) | — | — | 0.132 | 0.0738 |
| Resolution Factor | — | — | 0.00 | 0.00 |

| | Argon | | Oxygen | |
|---|---|---|---|---|
| | Blend #1 | Blend #2 | Blend #1 | Blend #2 |
| Heat of Adsorption (kcal/mol) | — | −4.14 | — | −4.14 |

Example 18

| | Gas Blend #1 | | Gas Blend #2 | |
|---|---|---|---|---|
| | 40° C. Run | 70° C. Run | 40° C. Run | 70° C. Run |
| Argon/Oxygen Selectivity | — | — | 1.36 | 1.26 |
| Argon Henry Constant (mmol/g/atm) | — | — | 0.0862 | 0.0525 |
| Oxygen Henry Constant (mmol/g/atm) | — | — | 0.117 | 0.066 |
| Resolution Factor | — | — | 1.82 | 0.800 |

| | Argon | | Oxygen | |
|---|---|---|---|---|
| | Blend #1 | Blend #2 | Blend #1 | Blend #2 |
| Heat of Adsorption (kcal/mol) | — | −3.53 | — | −4.06 |

Example 20

| | Gas Blend #1 | | Gas Blend #2 | |
|---|---|---|---|---|
| | 40° C. Run | 70° C. Run | 40° C. Run | 70° C. Run |
| Argon/Oxygen Selectivity | — | — | 1.07 | — |
| Argon Henry Constant (mmol/g/atm) | 0.0871 | — | 0.0881 | — |
| Oxygen Henry Constant (mmol/g/atm) | — | — | 0.0975 | — |
| Resolution Factor | — | — | 0.571 | — |

| | Argon | | Oxygen | |
|---|---|---|---|---|
| | Blend #1 | Blend #2 | Blend #1 | Blend #2 |
| Heat of Adsorption (kcal/mol) | — | — | — | — |

Example 22

| | Gas Blend #1 | | Gas Blend #2 | |
|---|---|---|---|---|
| | 40° C. Run | 70° C. Run | 40° C. Run | 70° C. Run |
| Argon/Oxygen Selectivity | — | — | 1.20 | 1.11 |
| Argon Henry Constant (mmol/g/atm) | 0.196 | — | 0.193 | 0.109 |
| Oxygen Henry Constant (mmol/g/atm) | — | — | 0.232 | 0.121 |
| Resolution Factor | — | — | 1.24 | 0.56 |

| | Argon | | Oxygen | |
|---|---|---|---|---|
| | Blend #1 | Blend #2 | Blend #1 | Blend #2 |
| Heat of Adsorption (kcal/mol) | — | −4.08 | — | −4.63 |

Example 24

| | Gas Blend #1 | | Gas Blend #2 | |
|---|---|---|---|---|
| | 40° C. Run | 70° C. Run | 40° C. Run | 70° C. Run |
| Argon/Oxygen Selectivity | — | — | — | — |
| Argon Henry Constant (mmol/g/atm) | — | — | 0.229 | 0.115 |
| Oxygen Henry Constant (mmol/g/atm) | — | — | — | — |
| Resolution Factor | — | — | — | — |

| | Argon | Oxygen |
|---|---|---|

TABLE II-continued

|  | Blend #1 | Blend #2 | Blend #1 | Blend #2 |
|---|---|---|---|---|
| Heat of Adsorption (kcal/mol) | — | — | — | — |

The gas chromatography procedure used to evaluate the compositions of these examples for selectivity and indications of gas capacity trends is well accepted and similar to that used by several workers; see for example, J. R. Conder and C. L. Young, "Physiocochemical Measurement by Gas Chromatography", John-Wiley (1979); R. J. Neddenriep, *J. Coloid Interface Science*, 28, 293(1968); and A. V. Kiselev and Y. I. Yashin, *Gas-Adsorption Chromatography*, Plenum Press (1969), pp. 120–125. The samples were thermally activated according to the procedure listed under each example number. Inert gas retention volumes for each column were determined using 10% neon in helium. The gas chromatography method was limited to the low pressure region of the isotherm and represents a limiting value for the selectivities that might be approached in the adsorption of gaseous mixtures at zero coverage. Nevertheless, the method is rapid and valuable for screening and ranking adsorbent performance and is reproducible to within 10%.

The retention volume of an injected species into the adsorbent is the product of the retention time and the corrected flow rate. Thus one can calculate the retention volume, $V_I$, of inert species (from neon retention data), and the retention volume, $V_j$, of the jth adsorbate at different temperatures.

The adsorption Henry constant for the jth adsorbate can be calculated from the following equation:

$$\kappa_j = (V_j - V_I)/W_s$$

$\kappa$ has the unit cc/gm or moles/gm/moles/cc. $\kappa$ is the initial slope of an adsorption isotherm in which the quantity on the ordinate has the units of moles/gm and the abcissa has the units of moles/cc. Using ideal gas law as follows, $\kappa$ can be converted to the initial slope $C_1$ of the isotherm in which the quantity on the abcissa is the partial pressure of the adsorbate in units of pressure. Isotherms from gravimetrics or volumetric data are usually of the form:

$$C_1 = \kappa/RT_{column}$$

where R is the gas constant and T is the gas chromatograph temperature in °K.

Multiplication of $C_1$ by the molecular weight of the adsorbate gives the quantity $C_2$ which has units of gm(adsorbate)/g(adsorbent)/atm.

The selectivity ratio of species 2 over species 1, $\alpha_1^2$, is defined as:

$$\alpha_1^2 = n_{1(ads)} n_{2(gas)} / n_{2(ads)} n_{1(gas)}$$

where $n_{j(ads)}$ is the number of moles in the adsorbed phase and $n_{j(gas)}$ is the number of moles in the gas phase.

The selectivity ratio of, for example, oxygen and argon separation is calculated from:

$$\alpha = \kappa_{oxygen}/\kappa_{argon}$$

The heat of adsorptions were calculated using the standard equation, see G. W. Castellan, *Physical Chemistry*, Addison-Wesley Publishing Company, 1964 and H. Purnell, *Gas Chromatography*, John Wiley & Sons, 1962:

$$\partial \ln V_s / \partial T = \Delta H_{ads}/RT^2$$

where:
$\Delta H_{ads}$ = heat of adsorption
T = temperature
R = gas constant
$V_s$ = specific retention volume This equation can be expanded to allow direct calculation of $\Delta H_{ads}$ using data obtained from different temperatures:

$$\Delta H_{ads} = -1.987 T_1 T_2 \ln[\xi]$$

where
$\xi = ([RT]_i - [RT]_n)_1 f_1° T_2 / ([RT]_i - [RT]_n)_2 f_2° T_1$

T = temperature
[RT] = retention time
f° = corrected flow rate

Table I gives the retention times for all the examples listed in the application. The ND entry for oxygen means that it was not detected.

Table II presents the thermodynamic properties of the zeolitic adsorbents prepared by the methods described in the above examples. These values, which are derived using standard procedures from the data in Table I, give the intrinsic properties of the material. In particular, the selectivity is only dependent on the temperature and is sometimes referred to as a separation factor. This factor in combination with the resolution factor (i.e., peak shape) will dictate whether or not two components are baseline resolved.

The following discussion of the gas chromatographic results will demonstrate the influence of operational parameters and adsorbent materials on the argon/oxygen separation using the two gas blends described above and the results listed in Tables I and II.

As stated previously, the adsorbents must be thoroughly dehydrated before one can affect a separation of argon and oxygen. Examples 2 to 8 show the effect of changing the process parameters used to dehydrate calcium chabazite. Comparison of the results in Table I, Example 2 to Example 8 shows that lowering the flow rate during dehydration of chabazite does not substantially effect the chromatography. Increasing the period of dehydration at 400° C. from 8 to 24 hours significantly increases the retention times and improves the separation factor, compare Examples 2 and 4.

Comparison of the results in Table I for example 2 compared to examples 5 and 6 shows the large negative effect on the chromatography if the dehydration temperature is decreased. Adsorbents dehydrated at 325° C. are not sufficiently dehydrated to affect oxygen-argon separation and dehydration at 250° C. is totally ineffective. Note that the procedures used in Example 5 are the same temperatures as are disclosed in the prior art except the time at temperature has been considerably increased from one to eight hours. Even at 325° C. for eight hours, the time-temperature history has not been enough to thoroughly dehydrate the absorbent. The lower ΔH (ads) values show that the oxygen is not interacting as strongly with the adsorbent.

Comparing the gas chromatography results for Example 7 to Example 2 shows that increasing the rate of temperature increase up to the final dehydration temperature from 3° C./min up to 12° C./min does not influence the results. Example 8 used dry nitrogen instead of He and illustrates that other dry nonreactive purge gases can be used to dehydrate the adsorbents.

To determine the operating range of parameters for dehydrating these materials, the following conditions were examined:

| Parameter | Conditions |
| --- | --- |
| Time: hr | 8, 24 |
| Temperature: °C. | 250, 325, 400 |
| Flow Rate: ml/min | 17, 67 at 400° C. column temperature |
| Temperature Ramp: °C./min | 3, 12 |
| Purge Gases | Helium, Nitrogen, and Zero Air |

Criteria used for evaluating these conditioning parameters were resolution of the argon and oxygen peaks and detectability of oxygen in Blend 2. Based on these experiments, reasonable conditioning parameters are:

| Parameter | Range |
| --- | --- |
| Time: hr | 8 to 72 |
| Temperature: °C. | 400+ |
| Flow Rate: ml/min | 2-200 at 400° C. column temperature |
| Temperature Ramp: °C./min | 0.5 to 25 |

The above gases provide typical examples. The use of the chromatographic materials of this invention should be applicable to other permanent gases in bulk He. Similar analyses for permanent gases should be possible in other bulk gas streams using the zeolitic adsorbents described by this invention.

According to the known laws of adsorption technology, any adsorbent can be used to affect the separation of a gaseous mixture in two ways: (1) using a carrier gas stream (such as GC analysis), or (2) by the principle of frontal analysis. Since we have shown that the polyvalent forms of chabazite effectively separate oxygen and nitrogen from argon it should be possible to remove oxygen and nitrogen from argon by the principle of frontal analysis. The efficiency of such a process will depend on a number of factors including the concentrations of the components to be removed, temperature of the process, and adsorption properties of the various gases on the particular adsorbent.

Due to the high heats of adsorption for nitrogen exhibited by the thoroughly dehydrated polyvalent forms of chabazite, they have sufficient nitrogen capacity to have practical utility for removing nitrogen impurities from argon. This is a direct consequence of the thermodynamic adsorption properties of these adsorbents. The calcium form of cabazite has a limiting nitrogen heat of adsorption of $-11.0$ kcal/mole and a nitrogen/argon selectivity of 15 at 30° C. The high values for these intrinsic properties are directly responsible for the increased capacity of these adsorbents for nitrogen in the presence of argon.

Even though these same adsorbents display the capability of separating oxygen from argon in a chromatographic application, both the gas capacity and oxygen/argon selectivity are much too low to have practical utility for removing oxygen from argon. On the other hand, gases having significant quadropole moments or permanent dipole moments should have sufficiently high adsorption properties that they can be removed from other bulk gases possessing lower adsorption properties.

Surprisingly, it was found that when thoroughly dehydrated in the presence of a non-reactive atmosphere or under vacuum, the polyvalent form of chabazite, particularly calcium, have significantly higher intrinsic adsorption properties. These enhanced properties result in improved adsorbents for a variety of separations. The higher heat of adsorption gives rise to increased capacity in the low pressure region at a given set of process conditions. It has been found that thoroughly dehydrated calcium chabazite has an order of magnitude higher capacity for nitrogen in the low pressure region than other known adsorbents, and it has been demonstrated that these adsorbents are effective nitrogen scavengers. In general, the materials of this invention display improved properties for removing low levels of gas contaminants having larger heats of adsorption than the bulk component. Other gas purifications which should be possible include:

dilute CO from $H_2$
dilute $N_2$ from $H_2$
dilute $CH_4$ from $H_2$
dilute $CH_4$ from $H_2$
dilute $N_2$ from He
trace $N_2$ from Ar
trace $O_2$ from He
trace $O_2$ from $H_2$
trace $O_2$ from $N_2$ Also, the combination of the shape-selective properties of the medium pored chabazites and their increased heat of adsorption suggests that this class of adsorbents would be superior for removing nitrogen or other weakly interacting gases from bulk gases whose kinetic diameter exceeds that of the adsorbent's pore opening, i.e. $CF_4$ can be purified in this manner.

For the chabazites the method of reaching the final dehydration temperature does not appear critical. Activation of the calcium chabazite to a level of optimum performance can be carried out by any method which will remove all the water from the zeolite cavity including that surrounding the cations without causing structural collapse of the zeolite. To achieve this in a practical manner, a temperature of 400°–500° C. should be maintained while the adsorbent is purged with a brisk flow of a nonreactive gas. Alternatively, the adsorbent can be activated to similar temperature under vacuum. Increasing the number of divalent cations accessible to nitrogen will improve the adsorption capacity. For purification, the higher the exchange level of the polyvalent cation the batter. At the least a majority of the exchangeable ions should be in the divalent form.

The increased nitrogen capacity and higher nitrogen/argon selectivity for the chabazite described by this invention results in a superior nitrogen scavenger adsorbent. The data in Table III give the adsorption properties for several adsorbents which were thoroughly dehydrated by being activated to 400° C. for at least eight hours. For all the zeolites exchanging the sodium form or partially calcium exchanged form into the highly exchanged calcium form increases the nitrogen Henry contant and isosteric heat. The Henry constant determined from the GC screening provides a relative measure of the capacity in the linear (low pressure) region of the isotherm. The largest improvements occur when the calcium exchange level of chabazite is increased. Note that both the capacity and nitrogen/argon selectivity are twice as high for calcium chabazite compared to the adsorbents of the prior art (i.e. calcium mordenite). The table shows that typical adsorbents such as NaX or even the calcium form have much lower capacities and heats in the Henry region and would therefore be much less effective as nitrogen scavengers.

| | Nitrogen Adsorption Capacities g nitrogen per 100 g adsorbent | | |
|---|---|---|---|
| Temp. (C.) | Ca Chab. | Ca—Mordenite | Ratio |
| 4.5 | 0.00158 | 0.00078 | 2.03 |
| 29.9 | 0.00044 | 0.00020 | 2.20 |

At lower temperatures, calcium chabazite should have even higher relative capacities due to its relatively high average heat of adsorption for nitrogen.

TABLE III

| Entry | Adsorbent | Major Cation Form(s) | Major Ion Exchange Level (%) | Nitrogen Henry Constants at 30° C. (mmoles/g atm) | Isosteric Heats (kcal/mole/K.°) | 1% $N_2$/Ar Selectivity at 30° C. (a) |
|---|---|---|---|---|---|---|
| 1 | Mordenite | Na | >95 | 1.04 | −6.6 | NA |
| 2 | Mordenite | Ca | 70 | 3.8 | −9.6 | 8.8 |
| 3 | Chabazite | Ca | 59 | 0.99 | −6.8 | 3.9 |
| 4 | Chabazite | Ca | 88 | 9.8 | −11.1 | 14.8 |
| 5 | NaX | Na | 99 | 0.25 | −4.7 | NA |
| 6 | CaX | Ca | 98 | 2.67 | −7.7 | NA |

(a) Determined by Ideal Solution Adsorption Theory* after isotherm data was fitted.
*A. L. Myers and J. M. Prausnitz, AICheE J. 11 121(1965)

The thermodynamic data alone is not sufficient to determine if the selectivity and capacity enhancements observed for calcium chabazite would provide a significant impact for a purification process. The following examples show the utility of calcium chabazite as a nitrogen scavenger and its superiority over the calcium mordenite of the prior art.

In order to screen adsorbents for use in removing trace nitrogen (<100 ppm) from argon an adsorption model was developed. The model combines single-component isotherm data to estimate dual-component adsorption equilibria. The equilibrium capacity of the bulk gas (argon) is estimated using the empirical equation which is a modification of the lagmuir isotherm to account for adsorbent heterogeneity. The equilibrium capacity for the trace gas is estimated using a Henry's law constant fitted to low-presure adsorption data, with a major correction for sites occupied by the bulk gas. The two equations are solved simultaneously to estimate the capacities of both gases at equilibrium. This model was verified as accurate at trace gas levels in experiments as described in Examples 44 and 45 below. The results of the experiments compared to predicted values were:

| Nitrogen Conc. (ppm) | Nitrogen Adsorption Capacities g nitrogen per 100 g adsorbent | | |
|---|---|---|---|
| | Experimental | Predicted | Error |
| 3.5 | 0.00261 | 0.00264 | 1.1% |
| 94.0 | 0.0700 | 0.0710 | 1.4% |
| 94.0 | 0.0773 | 0.0710 | −8.2% |

This model indicated that calcium chabazite has superior characteristics for the removal of trace nitrogen from argon than other zeolites, such as calcium mordenite. For example, the model's predicted nitrogen loadings for 10 ppm nitrogen in argon at 100 psig on calcium chabazite were twice those for a calcium mordenite.

Example 26

215 grams of calcium chabazite adsorbent were charged to a stainless steel bomb 5.25 cm in diameter. The material was activated by heating to 400° C. while passing a 0.5 SCFH helium purge stream through the bed. These conditions were maintained for 12 hours, at which time the bed was allowed to cool to room temperature.

The bed was then submerged in a dry ice/methylene chloride bath at −78° C. A mixture of 94 ppm by volume nitrogen in dry argon (<0.15 ppm water) was passed through the bed at 15 SCFH and 100 psig. Outlet nitrogen concentrations were as follows:

| Elapsed Time (hrs) | Outlet Nitrogen Conc. (ppm) |
|---|---|
| 0.00 | ND (<1) |
| 0.22 | ND (<1) |
| 0.47 | ND (<1) |
| 0.72 | ND (<1) |
| 0.97 | ND (<1) |
| 1.22 | ND (<1) |
| 1.47 | 1.00 |
| 1.72 | 2.00 |
| 1.97 | 4.50 |
| 2.22 | 8.00 |
| 2.47 | 11.75 |
| 2.72 | 19.00 |
| 2.97 | 25.00 |
| 3.22 | 31.50 |
| 3.47 | 38.50 |
| 3.72 | 45.00 |

ND = not detected

Based on these results, equilibrium capacity for the mixture was estimated at 0.077 g nitrogen per 100 g adsorbent in the presence of bulk argon. The mass transfer zone length was estimated as 20 cm.

Example 27

The same experiment conducted in Example 26 was run identically, except that the feed gas contained only 3.5 ppm nitrogen in argon. Outlet nitrogen concentrations were as follows:

| Elapsed Time (hrs) | Outlet Nitrogen Conc. (ppm) |
|---|---|
| 0.00 | ND <1 |
| 0.17 | ND <1 |
| 0.25 | ND <1 |
| 0.50 | ND <1 |
| 0.75 | ND <1 |
| 1.00 | ND <1 |
| 1.25 | ND <1 |
| 1.50 | ND <1 |
| 1.75 | 1.00 |
| 2.00 | 1.00 |
| 2.25 | 1.00 |
| 2.50 | 1.00 |
| 2.75 | 1.00 |
| 3.00 | 1.25 |
| 3.25 | 1.50 |
| 3.50 | 1.50 |
| 3.75 | 1.75 |
| 4.00 | 2.00 |
| 4.25 | 2.75 |
| 4.50 | 2.75 |
| 4.75 | 2.75 |
| 5.00 | 2.75 |
| 5.25 | 3.00 |
| 5.50 | 3.25 |
| 5.75 | 3.50 |
| 6.00 | 3.50 |

Based on these results, equilibrium capacity for the mixture was estimated as 0.0026 g nitrogen per 100 g adsorbent in the presence of bulk argon. The mass transfer zone length was estimated as 22 cm.

Example 28

The use of calcium chabazite for nitrogen removal from argon was demonstrated in the testing of a bench-scale purification system. This system contained three vessels to remove impurities from argon, the first containing a copper catalyst for oxygen removal, the second containing 13X molecular sieve for $H_2O$ and $CO_2$ removal, and the third containing calcium chabazite for nitrogen removal.

The calcium chabazite vessel was approximately 2 inches in diameter and contained 370 grams of material. The bed was regenerated as in Example 26 and then submerged in a dry ice/methylene chloride bath at −78° C. 40 SCFH of argon containing 37.5 vppm nitrogen and 9.5 vppm oxygen were compressed to 70 psig and passed through the purification system. Outlet nitrogen concentrations from the chabazite bed were as follows:

| Elapsed Time (Hrs.) | Outlet nitrogen Concen. (ppmv) |
|---|---|
| 0 | ND <3 ppm |
| .30 | ND <3 ppm |
| .62 | ND <3 ppm |
| .93 | 6.5 |
| 1.2 | 16.0 |
| 1.5 | 18.0 |
| 1.9 | 23.0 |

Based on these results, the saturated bed capacity for the mixture was estimated as 0.02 g nitrogen per 100 g adsorbent. It should be noted that this nitrogen capacity may be lower than what could be ideally achieved since it is known that the feed gas to the chabazite bed did have about 1 vppm moisture present due to an experimental problem.

The separation of nitrogen from $CF_4$ provides an example of how these chabazite adsorbents are superior for removing gas contaminants from bulk gases which are too large to enter the zeolitic cavity, even if the heat of adsorption of the bulk gas is similar to that of the impurity.

Table IV summarizes the results for a series of GC studies which demonstrate that calcium chabazite effectively excludes $CF_4$ and can be used to remove nitrogen and oxygen. Henry constants and isosteric heats determined by GC evaluation are given for nitrogen, oxygen, and $CF_4$. No studies were carried out with CO, but it is expected that it will be readily adsorbed on any of these adsorbents since it has a permanent dipole.

TABLE IV

| Entry | Adsorbent | Major Cation Form(s) | Henry Constants at 30° C. (mmoles/g atm) | | | Isosteric Heats (kcal/mole/°K.) | | |
|---|---|---|---|---|---|---|---|---|
| | | | $O_2$ | $N_2$ | $CF_4$ | $O_2$ | $N_2$ | $CF_4$ |
| 1 | NaA (4A) | Na | 0.030 | 0.17 | NA | −4.86 | −5.10 | NA |
| 2 | CaA (5A) | Na, Ca | 0.107 | 0.400 | 1.172 | −3.82 | −5.58 | −5.46 |
| 3 | NaX (13X) | Na | 0.084 | 0.245 | 0.918 | −3.49 | −4.74 | −5.302 |
| 4 | Chabazite | Na, Ca | 0.232 | 0.994 | 0.054 | −5.25 | −6.81 | −5.84* |
| 5 | Chabazite | Ca | 0.766 | 9.80 | 0.075 | −6.67 | −11.11 | −6.90* |
| 6 | Na Mordenite | Na | 0.305 | 2.18 | 0.0153 | −4.29 | −9.14 | −6.18* |
| 7 | Ca Mordenite | Ca | 0.411 | 3.78 | 0.007 | −6.62 | −9.56 | −6.78* |

*$CF_4$ Henry constant indicates minimal adsorption; this minimal adsorption is most likely on the surface and not in micropores.
NA—not adsorbed Sodium A zeolite is a small pore zeolite which totally excludes $CF_4$. (The retention time for $CF_4$ is less than that for the inert Ne used to obtain dead volume for the column.) The nitrogen and particularly oxygen capacity (indicated by the Henry constants) on this adsorbent are impracticably low. Ca exchange of NaA results in a larger pore zeolite which adsorbs $CF_4$ readily and has a $CF_4$ capacity 3 times that for nitrogen and 12 times that for oxygen, therefore it is totally ineffective for $CF_4$ cleanup. Sodium X is a large pore faujasite in which $CF_4$ has over three times the capacity of nitrogen and also would be ineffective for a $CF_4$ purification process. It is reasonable to expect that any ion form of X or A zeolite would be inappropriate to use for this application.

Table IV shows the large improvement in capacities that are achieved for oxygen and nitrogen in the low pressure region by using a chabazite molecular sieve; the chabazite has twice the oxygen and nitrogen capacity as CaA and essentially excludes $CF_4$. The small Henry constants (K<0.1) for $CF_4$ are inconsistent with the $\Delta H$ values and are most likely due to strong surface adsorption of a small quantity of $CF_4$. It is noteworthy that while nitrogen and $CF_4$ have comparable heats of adsorption on chabazite, the Henry constant is much smaller for CF$_4$. This strongly suggests that CF$_4$ is largely excluded from the zeolite micropores but adsorbs to a negligible extent on the external surface of the crystals.

The calcium exchanged form of Linde chabazite results in an additional ten-fold increase in the nitrogen capacity at the pressures of interest. The large rise in isosteric heats for nitrogen and oxygen is consistent with the observed increases in capacity.

Mordenites in the sodium and calcium form were also evaluated. They exclude CF$_4$ and are substantially better than A or X type but inferior to the chabazites.

The above results indicate that calcium chabazite should provide the most effective adsorbent for removing nitrogen and oxygen from CF$_4$. Lowering the operating temperature should result in further improvements and increase the nitrogen capacity significantly.

Example 29

A vessel was charged with 228 g of calcium chabazite adsorbent. The material was then activated and cooled as described in Example 26. A feed gas containing 570 ppm nitrogen in CF$_4$ was passed through the bed at 6.15 SCFH. Outlet nitrogen concentrations were as follows:

| Elapsed Time (hrs) | Outlet Nitrogen Conc. (ppm) |
|---|---|
| 0.00 | ND <17 |
| 1.03 | ND <17 |
| 2.00 | ND <17 |
| 2.50 | ND <17 |
| 3.00 | ND <17 |
| 3.50 | ND <17 |
| 4.00 | ND <17 |
| 4.50 | ND <17 |
| 5.03 | 20 |
| 5.55 | 28 |
| 6.07 | 45 |
| 6.58 | 72 |
| 7.10 | 92 |
| 7.62 | 132 |
| 8.13 | 173 |
| 8.65 | 223 |
| 9.17 | 289 |
| 9.68 | 358 |
| 10.20 | 432 |
| 10.72 | 489 |
| 11.23 | 546 |
| 11.75 | 572 |

Based on these results, equilibrium capacity for the mixture was estimated as 0.40 g nitrogen per 100 g adsorbent. The same experiment run with Linde AW-500 Na/Ca chabazite (non-exchanged) showed a capacity of 0.13 g nitrogen per 100 g adsorbent. The higher overall capacities, as compared to the nitrogen/argon system, are due to the non-competitive nature of the nitrogen/CF$_4$ separation, i.e. CF$_4$ does not enter the zeolite.

Example 30

The same experiment conducted in Example 29 was run identically, except that the feed gas contained 4600 ppm nitrogen in CF$_4$. Outlet nitrogen concentrations were as follows:

| Elapsed Time (hrs) | Outlet Nitrogen Conc. (ppm) |
|---|---|
| 0.00 | ND <17 |
| 0.52 | ND <17 |
| 1.03 | ND <17 |
| 1.55 | 263 |
| 2.07 | 1280 |
| 2.58 | 1372 |
| 3.10 | 5066 |
| 3.62 | 3521 |
| 4.13 | 5143 |
| 4.65 | 4384 |

Based on these results, equilibrium capacity for the mixture was estimated as 1.17 g nitrogen per 100 g adsorbent. The same experiment run with Linde AW-500 Na/Ca chabazite (non-exchanged) showed a capacity of 0.54 g nitrogen per 100 g adsorbent.

Figure 1:
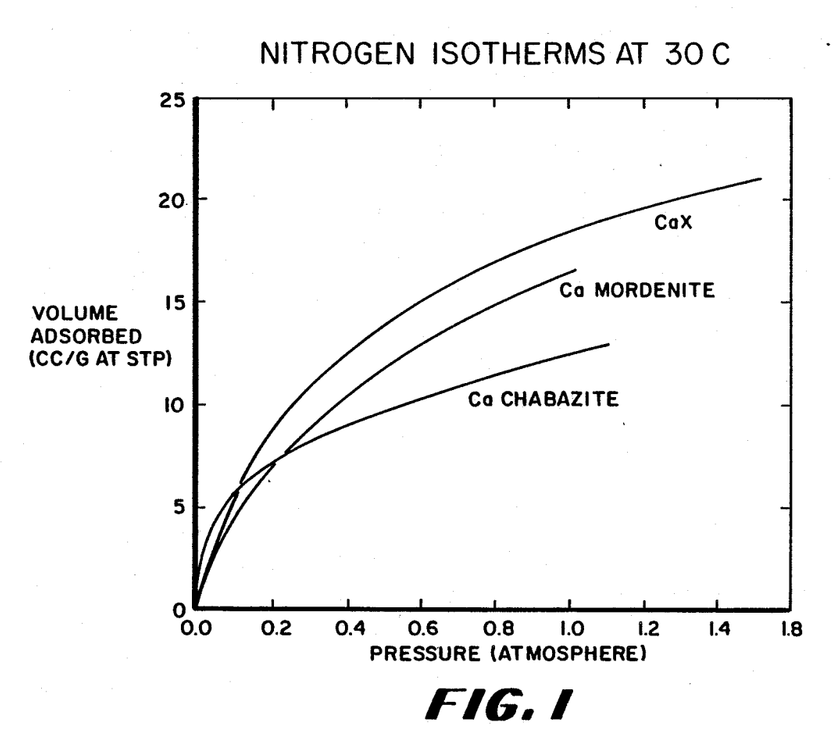
FIG. 1 is a diagram of the nitrogen isotherms at 30° C. for the calcium forms of chabazite, X zeolite, and mordenite.
Figure 2:
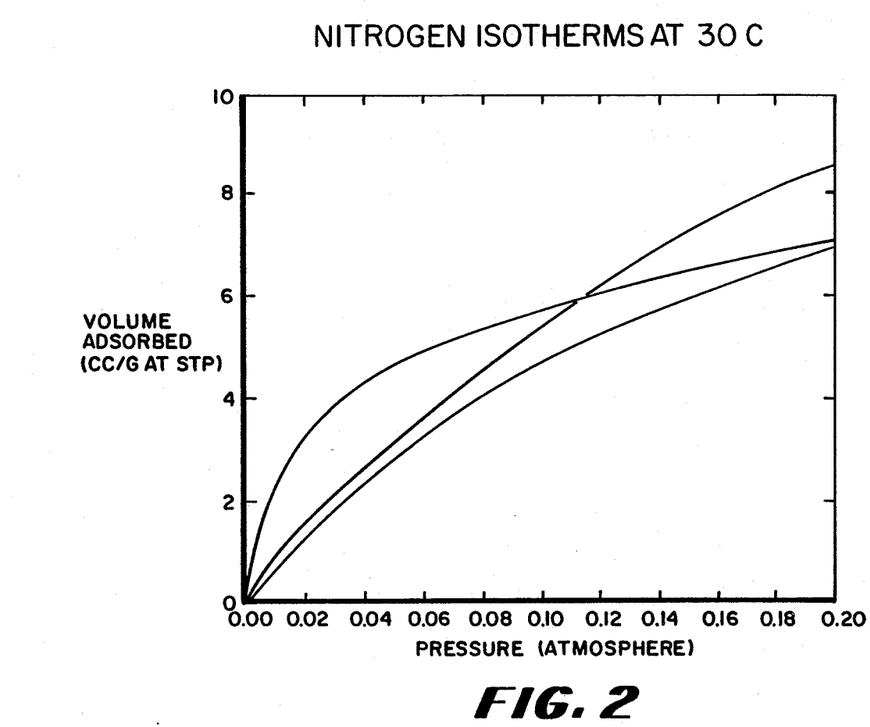
FIG. 2 is a diagram of the low pressure regime nitrogen isotherms at 30° C. for the calcium forms of chabazite, X zeolite, and mordenite.

As a graphical representation of the findings from the above examples, FIG. 1 presents the nitrogen isotherms at 30° C. for the calcium forms of chabazite, X zeolite, and mordenite. The high nitrogen heat of adsorption for Ca Chabazite is reflected in the isotherm shape. Note that at ambient pressures (around one atmosphere) both CaX and Ca Mordenite have higher nitrogen capacities compared to Ca chabazite. However, at pressures below 0.02 atmosphere (the region of interest for removing ppm levels of nitrogen contaminant) the Ca chabazite has significantly greater nitrogen capacity, see FIG. 2.

Figure 3:
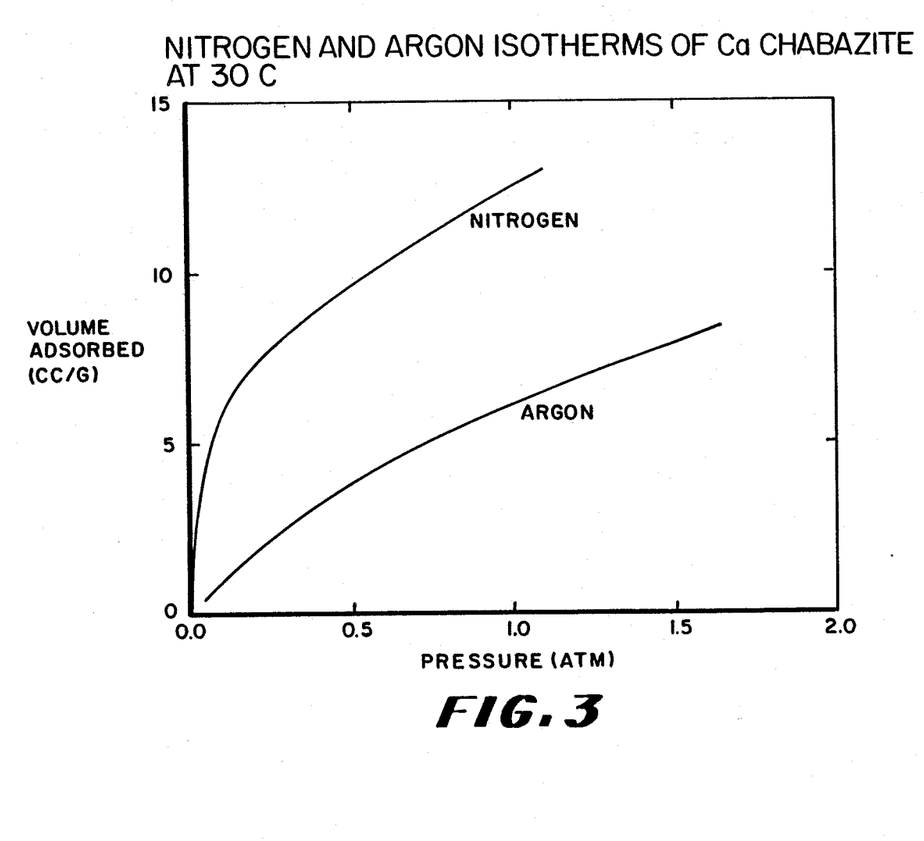
FIG. 3 is a diagram of the nitrogen and argon isotherms at 30° C. for Ca chabazite.

FIG. 3 shows the nitrogen and argon isotherms at 30° C. for Ca chabazite and clearly shows the large selectivity for nitrogen over argon at these conditions.

The present invention has been described with reference to several preferred embodiments thereof. However, these embodiments should not be considered a limitation on the scope of the invention, which scope should be ascertained by the following claims.

We claim:

1. In a process for the selective adsorption and separation of one or more constituents from a gas stream, wherein the gas stream is contacted with a zeolitic adsorbent contained within a column maintained within a gas chromatograph while having an inert carrier gas continually flowing through the column, the improvement for the selective adsorption and separation of the constituents comprises utilizing a dehydrated chabazite adsorbent having a residual water content of less than 1.5 wt% as the zeolite adsorbent, wherein the dehydrated chabazite has at least 50% of any exchangeable ion capacity exchanged with a polyvalent metal cation.

2. The process of claim 1 wherein the polyvalent metal cation is a divalent metal.

3. The process of claim 1 wherein the polyvalent metal cation is an alkaline earth metal.

4. The process of claim 1 wherein the polyvalent metal cation is calcium.

5. The process of claim 1 wherein two of the constituents which are separated from each other are argon and oxygen.

6. The process of claim 5 wherein argon and oxygen are present in the gas stream in trace amounts.

* * * * *